Oct. 21, 1930.  M. B. RATCLIFFE  1,779,217
FORCE FEED LUBRICATING DEVICE
Filed March 29, 1929  2 Sheets-Sheet 1
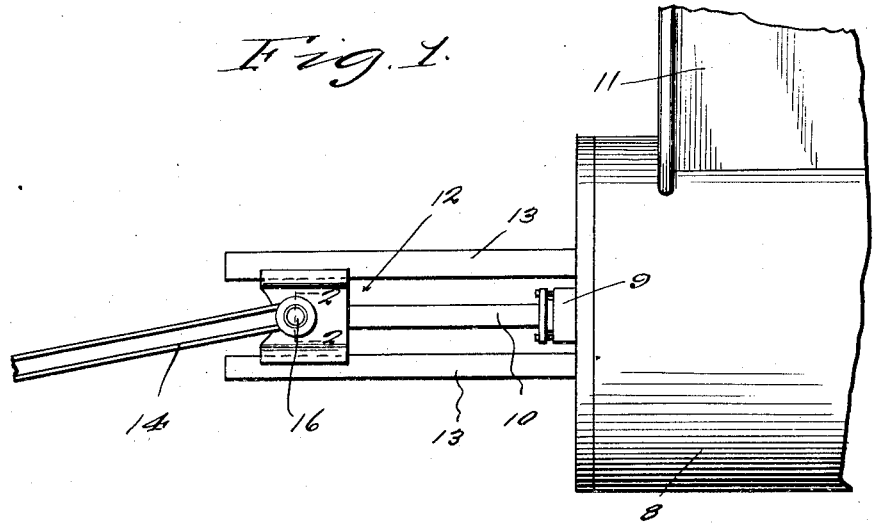
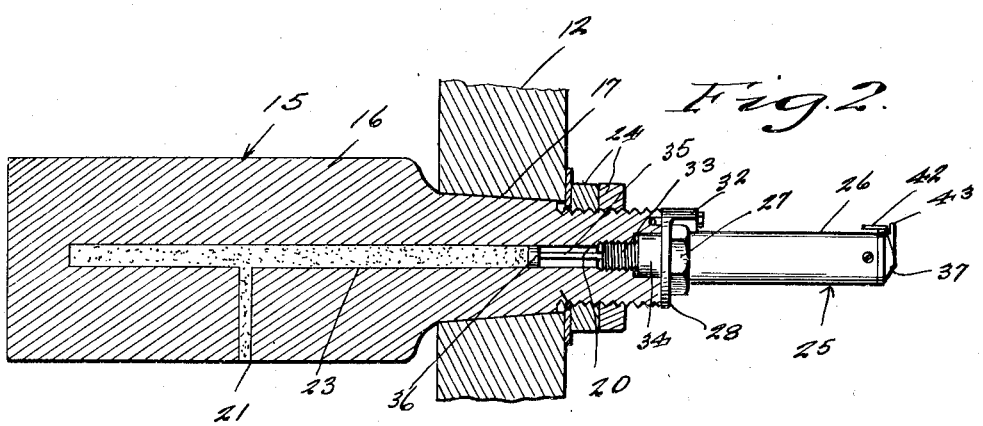
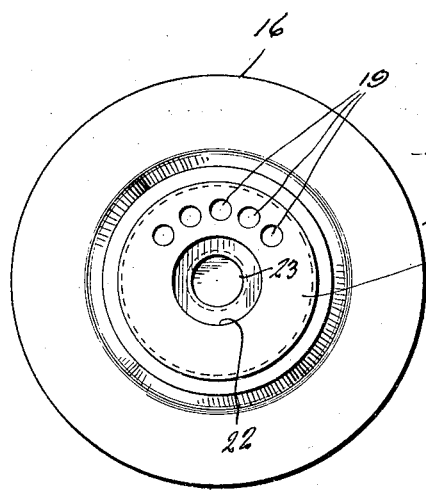
Inventor
*Myrtle B. Ratcliffe*
By *Clarence A. O'Brien*
Attorney Oct. 21, 1930.   M. B. RATCLIFFE   1,779,217
FORCE FEED LUBRICATING DEVICE
Filed March 29, 1929   2 Sheets-Sheet 2
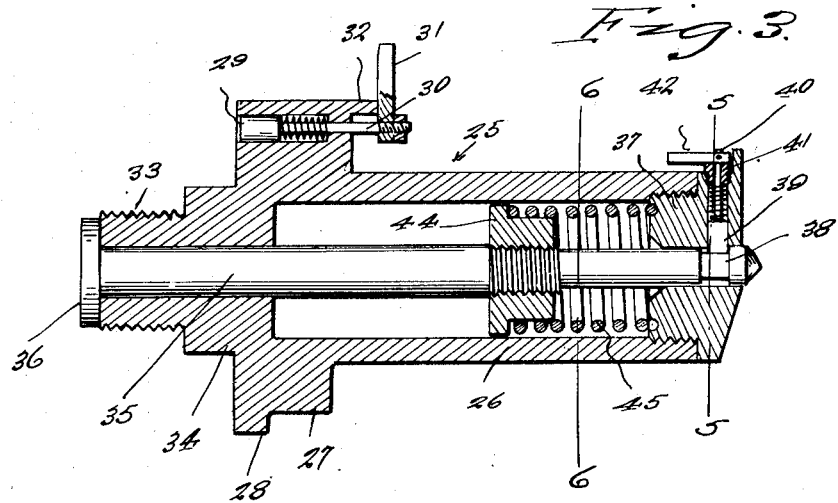
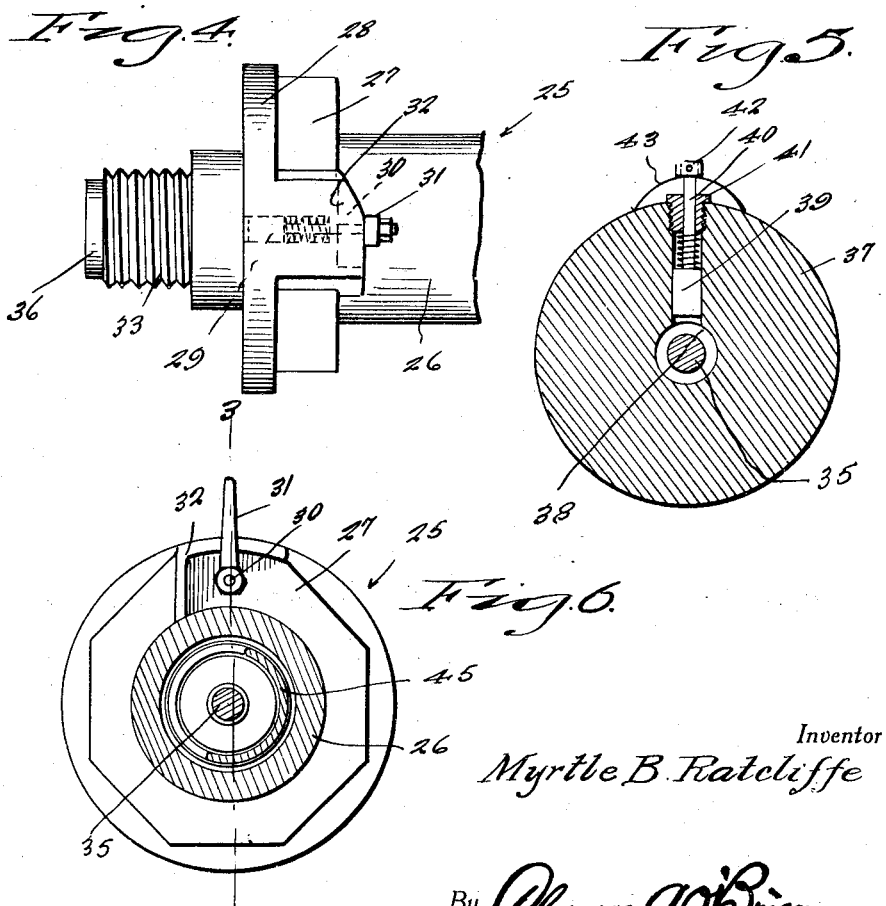
Inventor
*Myrtle B. Ratcliffe*
By *Clarence A. O'Brien*
Attorney Patented Oct. 21, 1930

1,779,217

UNITED STATES PATENT OFFICE

MYRTLE B. RATCLIFFE, OF WINSTON-SALEM, NORTH CAROLINA

FORCE-FEED LUBRICATING DEVICE

Application filed March 29, 1929. Serial No. 350,896.

This invention relates to a steam engine accessory in the form of a lubricant or grease heating device for use in association with a reciprocatory cross head, journal pin and its cooperable pitman or connecting rod.

The invention has more specific reference to an auxiliary appliance or attachment which is constructed for connection with one end of the journal pin and which is made to continuously exert heating pressure against the lubricating grease in the existing lubricant containing bores of said journal pin. At the present time, this result is obtained in a rather crude manner. To understand this it should be stated that the journal pin is provided with a longitudinal grease containing bore and a lateral grease discharging bore. Initially the grease is placed under pressure by merely threading a bolt into the screw threaded end portion of the longitudinal bore. When, however, the compression action of this bolt is expended, the grease stops feeding until sufficient friction is generated and heat thus produced to melt this comparatively heavy grease. This is regarded as a rather crude lubricating method for such vital mechanical details as the operating connection between the connecting rod and reciprocatory cross-head.

What I propose to do is to eliminate the grease compressing bolt and to substitute a force feed plunger device therefor which maintains the grease under pressure sufficiently long to insure effective lubrication and until the used grease is replenished.

In carrying out the invention I have found it practical to provide a force feed appliance which may be attached to the existing screw-threaded end of the connecting rod journal pin without requiring alterations.

Other features and advantages will become more readily apparent from the following description and drawings.

In the drawings:

Figure 1 is a fragmentary side elevational view showing a portion of the conventional steam engine with the improved force feed device in place.

Figure 2 is an enlarged longitudinal section taken approximately on the plane of the line 2—2 of Figure 1.

Figure 3 is a longitudinal section through the force feed plunger device, the view being taken approximately on the plane of the line 3—3 of Figure 6.

Figure 4 is a fragmentary view of the inner end portion of the device detailed in Figure 3.

Figure 5 is a cross section taken approximately upon the plane of the line 5—5 of Figure 3.

Figure 6 is an enlarged cross section on the line 6—6 of Figure 3.

Figure 7 is an end view of the screw threaded end portion of the journal pin seen in Figure 2, the appliance being removed.

Attention is first invited to Figure 1 wherein it will be observed that the reference character 8 designates a cylinder, 9 a stuffing box, 10 a piston rod slidable through the stuffing box connected with the customary piston (not shown) within the cylinder. The reference character 11 designates the usual valved steam chest. As seen here the piston rod is connected with the reciprocatory cross head 12, and it is located between the cross head guide 13. Motion is imparted to the cross head by the pitman or connecting rod 14, and this is connected with the cross head through the medium of the journal pin 15. The body portion of this pin 16 is of usual design and is provided at the right hand end of Figure 2 with a reduced end portion 17 terminating in a still further reduced screw threaded extremity 18 (see Figure 7) which in accordance with the invention has its terminal face formed with a series of sockets 19 which serve in a manner to be hereinafter described. The body portion has the usual grease containing longitudinal bore 20 and the central right angularly or angularly disposed discharge bore 20. The grease is packed in these bores and is forced out through the bore 21 to lubricate the bearing of the connection rod. The reference character 22 designates a counterbore in the outer screw threaded end portion 18 inward of which is an internal screw threaded portion 23. The reference character 24 designates the retaining nut effecting a driving connection between the cross head and the journal pin as seen plainly in Figure 2.

The improved force feed attachment or device is generally designated by the reference character 25 and as plainly seen in Figure 2 it is adapted to be associated with a counterbored screw threaded end portion of the pin 15. The entire device is detailed in Figure 3, wherein it will be seen that 26 designates a cylinder having an integral outstanding enlargement at the left hand end including a nut 27 and flange 28. In accordance with the present invention this enlargement is formed with a socket to accommodate a spring pressed retaining latch 29 which is cooperable with the aforesaid socket 19, see Figure 7. The rod portion 30 of this latch carries a retaining finger 31 which is cooperable with a cam shoulder 32 as better shown in Figure 4. At this end the screw threaded nipple 33 which is tapped into the internally screw threaded portion 23 of the journal pin is represented in Figure 2. The portion 34 fits into the counterbore 22, and these portions are formed with a passage forming a guide for the stem 35 of the plunger. The plunger is provided on the left hand end of the disk head 36 adapted to slide in the longitudinal bore 20 and to exert pressure against the grease as seen in Figure 2. The reference character 37 designates a screw threaded plug which is screwed into the opposite end of the cylinder 26 as seen in Figure 3. This plug has a central opening through which the reduced end of the stem 36 is slidable. This reduced end is formed with a circumferential groove 38 forming a keeper with which a spring pressed latch 39 is cooperable. This latch includes a rod portion 40 extending through a guide bushing 41 (see Figure 5) and carrying an operating handle 42. This is cooperable with a retaining cam 43. This cam and handle arrangement permits the latch 39 to be maintained in retracted state seen in Figure 5 or to permit it to be projected into the keeper 38 as seen in Figure 3. The reference character 44 designates a shoulder forming nut on the screw threaded intermediate portion of the plunger 35 seen in Figure 3. Cooperable with this is an expansion coiled spring 45. The spring bears at one end against the nut, and at the opposite end against the plug and surrounds the stem. Incidentally the purpose of the keeper 38 and the complemental retaining latch 39 is to hold the spring 45 in a contracted state as represented in Figure 3 and to also maintain the disc head 36 in a position here seen in order that the complete device may readily be put in position. After the device is in place however, the latch is released to the position seen in Figure 5 whereupon the spring pressed plunger 36 becomes effective to exert pressure upon the grease in the bores 20 and 21 as seen in Figure 2. It is also obvious that the first named latch 29 is desirable for providing a retaining connection between the device 25, as a whole, and the screw threaded end of the journal pin. In other words this latch 29 and the complemental socket prevents retrograde rotation and accidental loss of the lubricant force feed device 25.

Obviously, in practice, the spring pressed plunger disc 38 functions as an automatic follower to maintain constant pressure against the column of grease and to insure effective supply of this grease lubricant to the bearing surface of the journal pin.

From the foregoing description and drawings it will be seen that I have evolved and produced a novel attachment which is practical in construction, efficient in operation, economical, and otherwise advantages in fulfilling the requirements of a device of this class. Persons skilled in the art will doubtless be able to obtain a clear understanding of the features and advantages after reading a description in conjunction with the drawings. Therefore, a more lengthy description is regarded unnecessary.

Minor changes in shape, size, and rearrangement of details coming within the field of invention claimed may be resorted to in actual practice if desired.

Having thus described the invention, what I claim as new and desire to secure by Letters Patent is:—

1. In a structure of the class described, in combination, a connecting rod journal pin having a main longitudinal grease containing bore opening through one end and having an intermediate grease discharge bore communicating with the intermediate portion of the longitudinal bore, said one end of the pin being provided with an internally screw threaded portion and a complemental counterbore, a cylinder having a screw threaded end tapped into said internally screw threaded portion and also having its adjacent portion located in said counterbore, a spring pressed plunger in said cylinder including a stem having a head on one end slidable in the adjacent end portion of said longitudinal bore, the screw threaded end portion of said pin having sockets, and said cylinder being provided with a spring pressed retaining latch for selective reception in said socket.

2. In a force feed lubricating device for a connecting rod journal pin of the class described, a cylinder having guiding and attaching means at one end, a locking device on the the cylinder for locking said cylinder in a predetermined position relative to said journal pin, a spring pressed latch device also mounted on the cylinder adjacent said one end, a stem slidable in said guide, a plunger head on one end of the stem associated with the guide, spring projecting means in said cylinder, and a spring pressed latch device carried by the last named end of said cylinder, and cooperable with a keeper formed in said stem, whereby to permit the plunger to be maintained in a temporary retracted state.

3. A force feed lubricating device of the class described, comprising a cylinder open and internally screw threaded at one end, provided at its opposite end with an enlargement, and bored extremity extending beyond said enlargement and terminating in a screw threaded attaching nipple, said enlargement being provided with spring pressed retaining latch, and means for holding said latch in an ineffective position, a plunger including a stem extending through said guide and into said cylinder, said stem being provided with a follower head on one end and having its opposite end provided with a circumferential groove providing a keeper, a plug threaded into the open screw threaded end of said cylinder, a retaining latch carried by said plug and cooperable with said keeper, means associated with said last named latch for holding the latch in releasing position, a coiled spring in said cylinder surrounding said stem and bearing at one end against said plug, and a shoulder on the stem with which the opposite end of the spring is engageable.

In testimony whereof I affix my signature.

MYRTLE B. RATCLIFFE.